United States Patent
Kon et al.

(10) Patent No.: US 12,531,234 B2
(45) Date of Patent: Jan. 20, 2026

(54) ANODE ACTIVE MATERIAL, ALKALINE STORAGE BATTERY, AND METHOD FOR PRODUCING ANODE ACTIVE MATERIAL

(71) Applicant: TOYOTA JIDOSHA KABUSHIKI KAISHA, Toyota (JP)

(72) Inventors: Makio Kon, Mishima (JP); Hideki Iba, Toyota (JP); Yukinari Kotani, Gotemba (JP); Naotaka Sawada, Fuji (JP); Tomoya Matsunaga, Susono (JP); Hiroshi Nishiyama, Okazaki (JP); Hiroshi Suyama, Mishima (JP); Masashi Kodama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 666 days.

(21) Appl. No.: 17/885,787

(22) Filed: Aug. 11, 2022

(65) Prior Publication Data
US 2023/0071774 A1  Mar. 9, 2023

(30) Foreign Application Priority Data
Aug. 23, 2021  (JP) .................... 2021-135619

(51) Int. Cl.
*H01M 4/38*  (2006.01)
*H01M 4/04*  (2006.01)
(Continued)

(52) U.S. Cl.
CPC ......... *H01M 4/366* (2013.01); *H01M 4/0402* (2013.01); *H01M 4/0471* (2013.01);
(Continued)

(58) Field of Classification Search
CPC ........ H01M 4/04; H01M 4/0402; H01M 4/36; H01M 4/366; H01M 4/0471; H01M 4/38; H01M 4/48
See application file for complete search history.

(56) References Cited

U.S. PATENT DOCUMENTS

| | | | | | |
|---|---|---|---|---|---|
| 5,004,657 | A | * | 4/1991 | Yoneda | H01M 10/347 429/304 |
| 2002/0197530 | A1 | * | 12/2002 | Tani | H01M 4/0416 429/231 |

(Continued)

FOREIGN PATENT DOCUMENTS

| | | |
|---|---|---|
| JP | H09-63569 A | 3/1997 |
| JP | 2002-141061 A | 5/2002 |
| JP | 2016-129102 A | 7/2016 |

OTHER PUBLICATIONS

Devina Pillay and Michelle D. Johannes, "A First Principles Study of the Effects of Sulfur Adsorption on the Activity of Pt, Ni and Pt3Ni", AIChE, The 2007 Annual Meeting, Salt Lake City, UT, Nov. 5, 2007. Retrieved online on Mar. 7, 2025 from: https://aiche.confex.com/aiche/2007/techprogram/P85825.HTM.*

(Continued)

*Primary Examiner* — Kenneth J Douyette
(74) *Attorney, Agent, or Firm* — Oliff PLC (57) ABSTRACT

A main object of the present disclosure is to provide an anode active material with excellent capacity properties. The present disclosure achieves the object by providing an anode active material to be used in an alkaline storage battery, the anode active material including: a base material containing Ti and Cr, and including a BCC structure as a metastable phase; and a coating layer that coats the base material, and contains a catalyst metal and a metal with oxygen affinity that is more than oxygen affinity of Ti; wherein an oxide film is present in an interface between the coating layer and the (Continued)

base material; and when a first thickness $T_A$ (nm) and a second thickness $T_B$(nm) of the oxide film are determined by Auger electron spectroscopy, a rate of the $T_A$ with respect to the $T_B$, which is $T_A/T_B$ is, for example, 1.50 or more.

13 Claims, 3 Drawing Sheets

(51) Int. Cl.
  *H01M 4/36* (2006.01)
  *H01M 4/48* (2010.01)
  *H01M 10/24* (2006.01)
  *H01M 4/02* (2006.01)

(52) U.S. Cl.
  CPC ............... *H01M 4/38* (2013.01); *H01M 4/48* (2013.01); *H01M 10/24* (2013.01); *H01M 2004/027* (2013.01)

(56) References Cited

U.S. PATENT DOCUMENTS

2006/0088766 A1* 4/2006 Kim ................ C01G 31/006
 423/594.15
2016/0079603 A1* 3/2016 Nitta ................ H01M 4/9033
 502/5
2017/0025698 A1* 1/2017 Shishikura .......... H01M 4/9041

OTHER PUBLICATIONS

Lee H. et. al. "Hydrogen Storage and Electrochemical Properties of The Ti0.32Cr0.43-x-yV0.25FexMny (x=0-0.055, y=0-0.080) Alloys and Their Composites With MmNi3.99Al0.29Mn0.3Co0.6 Alloy", Journal of Alloys and Compounds, Elsevier Sequoia, Lausanne, Ch, vol. 566, Mar. 14, 2013, pp. 37-42.

Takacs, L. et al. "Temperature of the Milling Balls in Shaker and Planetary Mills", Journal of Materials Science, Kluwer Academic Publishers, BO, vol. 41, No. 16, May 27, 2006, pp. 5246-5249.

* cited by examiner

ANODE ACTIVE MATERIAL, ALKALINE STORAGE BATTERY, AND METHOD FOR PRODUCING ANODE ACTIVE MATERIAL

TECHNICAL FIELD

The present disclosure relates to an anode active material, an alkaline storage battery, and a method for producing the anode active material.

BACKGROUND

As an anode active material for an alkaline storage battery, a hydrogen storing alloy has been known. For example, Patent Literature 1 discloses a method for producing a hydrogen storing alloy electrode, the method comprising: a step of mixing Ni powder with a hydrogen storing alloy containing at least Ti, not containing Ni, having a body-centered cubic structure and having a spherical particle shape, and giving a shearing force to the obtained mixture to have Ni adhere to the surface of the hydrogen storing alloy; and a step of forming an alloy layer containing at least Ti and Ni, on a surface part of the hydrogen storing alloy, by performing a heat treatment to the hydrogen storing alloy with Ni adhered on the surface. Further, Patent Literature 1 discloses a TiCrV-based hydrogen storing alloy in Examples.

CITATION LIST

Patent Literature

Patent Literature 1: Japanese Patent Application Laid-Open (JP-A) No. 2002-141061

SUMMARY OF DISCLOSURE

Technical Problem

One of the advantages of the TiCrV-based hydrogen storing alloy including a body-centered cubic structure (BCC structure) is its excellent capacity properties. On the other hand, V (vanadium) is high-priced, and thus it is desired to reduce the proportion of V in the hydrogen storing alloy. However, when the proportion of V is low in the hydrogen storing alloy, it is difficult to produce a hydrogen storing alloy including the BCC structure as a stable phase.

Meanwhile, the inventors of the present disclosure have obtained a knowledge that a TiCr-based hydrogen storing alloy not containing V, and including the BCC structure as a metastable phase can be produced by using, for example, a gas atomizing method. However, capacity properties did not appear in the TiCr-based hydrogen storing alloy including the BCC structure as a metastable phase, and it did not work as an anode active material.

The present disclosure has been made in view of the above circumstances and a main object thereof is to provide an anode active material with excellent capacity properties.

Solution to Problem

The present disclosure provides an anode active material to be used in an alkaline storage battery, the anode active material comprising: a base material containing Ti and Cr, and including a BCC structure as a metastable phase; and a coating layer that coats the base material, and contains a catalyst metal and a metal with oxygen affinity that is more than oxygen affinity of Ti; wherein an oxide film is present in an interface between the coating layer and the base material; and when a maximum oxygen concentration $C_{MAX}$ (at %) of the oxide film near the interface, and a position $P_1$ where the $C_{MAX}$ is obtained, are determined by Auger electron spectroscopy, and when $\frac{1}{2}C_{MAX}$ designates a half value of the $C_{MAX}$, $P_A$ designates a position where the $\frac{1}{2}C_{MAX}$ is obtained in a region closer to the coating layer side than the $P_1$, $P_B$ designates a position where the $\frac{1}{2}C_{MAX}$ is obtained in a region closer to the base material side than the position $P_1$, and when a distance from the P to the $P_A$ is regarded as a first thickness $T_A$ (nm) of the oxide film, a distance from the $P_1$ to the $P_B$ is regarded as a second thickness $T_B$ (run) of the oxide film, a distance from the $P_A$ to the $P_B$ is regarded as a thickness T (nm) of the oxide film, and a measurement interval in a depth direction is regarded as $D_1$ (nm), the anode active material satisfies at least one of: (i) a rate of the $T_A$ with respect to the $T_B$, which is $T_A/T_B$ is 1.50 or more; (ii) a difference between the $T_A$ and the $T_B$, which is $T_A$- $T_B$ is larger than the $D_1$; and (iii) a rate of the $C_{MAX}$ with respect to the T, which is $C_{MAX}/T$ is 0.035 or less.

According to the present disclosure, when at least one of the (i) to (iii) is satisfied, the anode active material may have excellent capacity properties.

In the disclosure, the anode active material may satisfy the (i).

In the disclosure, the anode active material may satisfy the (ii).

In the disclosure, the anode active material may satisfy the (iii).

In the disclosure, the coating layer may contain at least one kind of Ni, Pd and Pt as the catalyst metal.

In the disclosure, the coating layer may contain Ti as the metal with oxygen affinity.

In the disclosure, the coating layer may contain La as the metal with oxygen affinity.

In the disclosure, the base material may contain V, and a proportion of the V in the base material may be less than 10 at %.

In the disclosure, the base material may not contain V.

The present disclosure also provides an alkaline storage battery including a cathode active material layer, an anode active material layer, and an electrolyte layer arranged between the cathode active material layer and the anode active material layer; wherein the anode active material layer contains the above described anode active material.

According to the present disclosure, since the anode active material layer contains the above described anode active material, the alkaline storage battery may have excellent capacity properties.

The present disclosure also provides a method for producing an anode active material to be used in an alkaline storage battery, the method comprising: a precursor forming step of forming a precursor by coating a base material containing Ti and Cr and including a BCC structure as a metastable phase, with a coating layer containing a catalyst metal and a metal with oxygen affinity that is more than oxygen affinity of Ti; and a heat treatment step of performing a heat treatment to the precursor to disperse oxygen included in an oxide film present in an interface between the coating layer and the base material, while maintaining the BCC structure in the base material.

According to the present disclosure, a heat treatment is performed to the precursor to disperse oxygen included in an oxide film present in an interface between the coating layer and the base material, while maintaining the BCC structure in the base material, and thus an anode active material with excellent capacity properties may be obtained.

Advantageous Effects of Disclosure

The anode active material of the present disclosure exhibits an effect of excellent capacity properties.

DESCRIPTION OF EMBODIMENTS

The anode active material, the alkaline storage battery, and the method for producing the anode active material will be hereinafter described in details.

A. Anode Active Material

Figure 1:
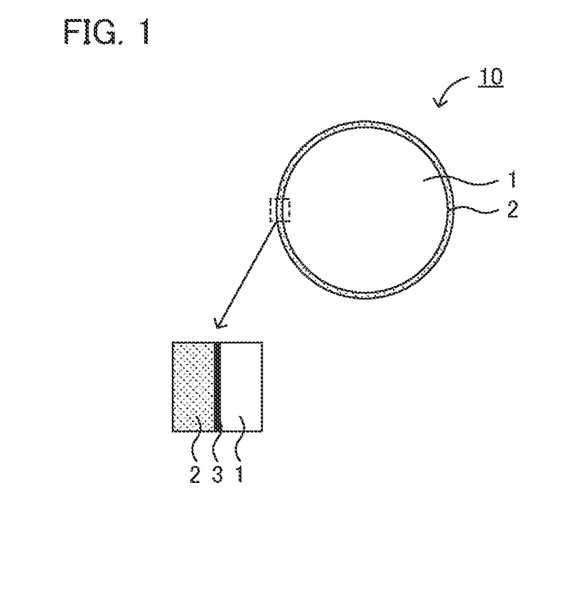
FIG. 1 is a schematic cross-sectional view exemplifying the anode active material in the present disclosure.

FIG. 1 is a schematic cross-sectional view exemplifying the anode active material in the present disclosure. Anode active material 10 shown in FIG. 1 includes base material 1, and coating layer 2 that coats the base material 1. The base material 1 contains Ti and Cr, and includes a BCC structure as a metastable phase. The coating layer 2 contains a catalyst metal and a metal with oxygen affinity that is more than oxygen affinity of Ti. Further, the base material 1 includes oxide film 3 on the coating layer 2 side surface. In other words, the oxide film 3 is present in between the coating layer 2 and the base material 1. The oxide film 3 is typically a passive film of the base material 1. In the present disclosure, the dispersion state of the oxygen included in the oxide film 3 satisfies the specified conditions.

According to the present disclosure, the dispersion state of the oxygen included in the oxide film satisfies the specified conditions, and thus the anode active material may have excellent capacity properties. As described above, one of the advantages of the TiCrV-based hydrogen storing alloy including a body-centered cubic structure (BCC structure) is its excellent capacity properties. On the other hand, V (vanadium) is high-priced, and thus it is desired to reduce the proportion of V in the hydrogen storing alloy. However, when the proportion of V is low in the hydrogen storing alloy, it is difficult to produce a hydrogen storing alloy including the BCC structure as a stable phase.

Meanwhile, the inventors of the present disclosure have obtained a knowledge that a TiCr-based hydrogen storing alloy not containing V, and including the BCC structure as a metastable phase can be produced by using, for example, a gas atomizing method. However, capacity properties did not appear in the TiCr-based hydrogen storing alloy including the BCC structure as a metastable phase, and it did not work as an anode active material.

Then, the inventors of the present disclosure have studied about using the TiCr-based hydrogen storing alloy including the BCC structure as a metastable phase, as a base material, and coating the base material with a coating layer including catalytic action. However, as in Comparative Examples described later, capacity properties did not appear only by coating the base material with the coating layer. Then, after repeating detailed studies on the interface between the base material and the coating layer, the inventors have obtained the knowledge that the oxide film present in the interface between the base material and the coating layer inhibits the hydrogen dispersion required for charge and discharge reactions.

For example, in the anode active material including the BCC structure as a stable phase, the BCC structure never changes its form to the other structure by a heat treatment. For this reason, for example, it is possible to remove the oxide film by heat dispersion performing a heat treatment at a sufficiently high temperature (such as 700° C.) to the anode active material. In contrast, in the case of the anode active material including the BCC structure as a metastable phase, the oxide film can be removed by the heat treatment at a high temperature, but the BCC structure cannot be maintained. On the other hand, with a heat treatment at a temperature capable of maintaining the BCC structure, the oxide film cannot be removed. In other words, in the case of the anode active material including the BCC structure as a metastable phase, a peculiar problem is that it is difficult to achieve both the maintenance of the BCC structure and the removal of the oxide film.

Then, after the thorough researches, the inventors have confirmed that, by adding a metal with oxygen affinity that is more than oxygen affinity of Ti, to the coating layer, oxygen included in the oxide film can be positively dispersed to the coating layer side, even when a heat treatment is performed at a temperature capable of maintaining the BCC structure. In other words, it was confirmed that the oxygen was peeled off from the oxide film to move to the coating layer side. As a result, inhibition of the hydrogen dispersion by the oxide film was alleviated, and the anode active material with excellent capacity properties was obtained.

In the present disclosure, the dispersion state of the oxygen included in the oxide film is determined by an elemental analysis with Auger electron spectroscopy (AES). In specific, a maximum oxygen concentration $C_{MAX}$ (at %) of the oxide film near the interface between the coating layer and the base material, and a position P where the $C_{MAX}$ is obtained, are determined by Auger electron spectroscopy. Next, when $\frac{1}{2}C_{MAX}$ designates a half value of the $C_{MAX}$, $P_A$ designates a position where the $\frac{1}{2}C_{MAX}$ is obtained in a region closer to the coating layer side than the $P_1$. Also, $P_B$ designates a position where the $\frac{1}{2}C_{MAX}$ is obtained in a region closer to the base material side than the position $P_1$. Next, a distance from the $P_1$ to the $P_A$ is determined as a first thickness $T_A$ (nm) of the oxide film. Also, a distance from the $P_1$ to the $P_B$ is determined as a second thickness $T_B$ (nm) of the oxide film. Also, a distance from the $P_A$ to the $P_B$ is determined as a thickness T (nm) of the oxide film.

In the present disclosure, it is preferable that the $T_A$ is larger than the $T_B$. In other words, it is preferable that on the basis of the $P_1$, the thickness (first thickness) of the oxide film in the coating layer side is comparatively large, and the thickness (second thickness) of the oxide film in the base material side is comparatively small. The rate of the $T_A$ with respect to the $T_B$, which is $T_A/T_B$ is, for example, 1.50 or more, may be 1.70 or more, may be 2.00 or more, and may be 2.30 or more. Meanwhile, the upper limit of the rate of the $T_A$ with respect to the $T_B$, which is $T_A/T_B$ is not particularly limited.

Also, the difference between the $T_A$ and the $T_B$, which is $T_A$- $T_B$ is, for example, 20 nm or more, may be 40 nm or more, may be 60 nm or more, and may be 80 nm or more. Meanwhile, the upper limit of the difference between the $T_A$ and the $T_B$, which is $T_A$- $T_B$ is not particularly limited. Also, in AES, a measurement interval in a depth direction is regarded as $D_1$ (nm). As described later, in the depth analysis with AES, the element concentration measurement in the outermost surface of the measurement target and the surface etching by spattering are repeatedly performed. For this reason, the data obtained from the depth analysis is not the continuous data, but is the discrete data measured per surface etching. $D_1$ (nm) designates a measurement interval calculated from the spattering rate. When $(T_A$- $T_B) \leq D_1$, the oxygen distribution is approximately symmetry on the basis of the peak of the oxygen concentration. Meanwhile, when $(T_A$- $T_B) > D_1$, the oxygen distribution is asymmetry on the basis of the peak of the oxygen concentration, and it can be said that the oxygen is dispersed more to the coating layer side compared to the base material side. Therefore, in the present disclosure, $(T_A$- $T_B)$ is preferably larger than $D_1$. The rate of $(T_A$- $T_B)$ with respect to $D_1$ is, for example, 1.1 or more, may be 1.5 or more, and may be 2.0 or more.

Also, it is preferable that the rate of $C_{MAX}$ with respect to the T, which is $C_{MAX}/T$ is small. It can be said that the smaller the $C_{MAX}/T$ is, the more the dispersion of oxygen is in progress. The $C_{MAX}/T$ is, for example, 0.035 or less, may be 0.030 or less, and may be 0.025 or less.

Also, in the present disclosure, at least one of (i) to (iii) is preferably satisfied, and two thereof may be satisfied, and all of them may be satisfied:
(i) $(T_A/T_B) \geq 1.50$;
(ii) $(T_A$- $T_B) > D_1$; and
(iii) $C_{MAX}/T \leq 0.035$.

Incidentally, the preferable ranges in (i) to (iii) are as described above.

1. Base Material

Figure 2:
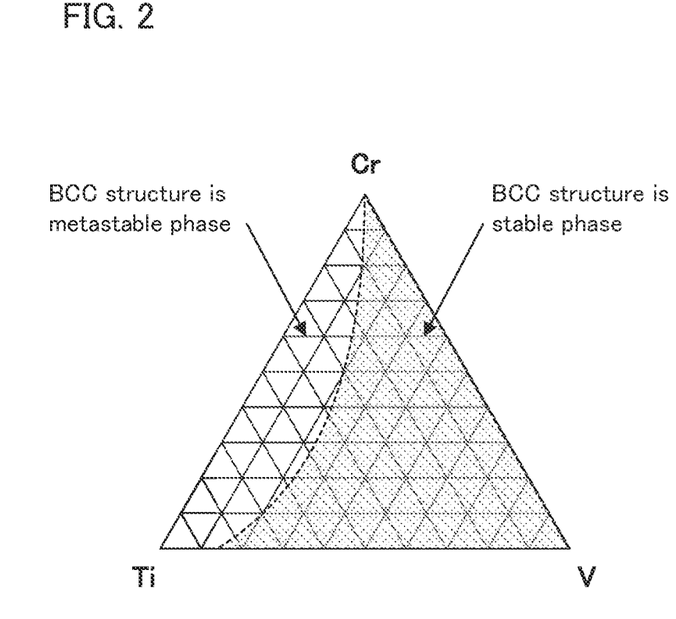
FIG. 2 is a three-dimensional view explaining the composition of the base material in the present disclosure.

The base material in the present disclosure contains Ti and Cr, and include a BCC structure as a metastable phase. Whether the BCC structure falls under the metastable phase is judged when the BCC structure changes its form to a Laves structure that is a stable phase at the time the base material is heated to its melting point. Incidentally, the TiCr-based hydrogen storing alloy including the Laves structure scarcely stores hydrogen in the pressure range (such as 0.1 MPa to 0.0001 MPa) mainly used for an alkaline storage battery. Also, for example, as shown in FIG. 2, in the three-dimensional view of Ti, Cr and V, the BCC structure is produced as a stable phase in the region with a high proportion of V. In this region, the BCC structure is maintained even when the base material is heated to the melting point. Meanwhile, in the region with a low proportion of V, the BCC structure cannot be present as a stable phase, and it is produced as a metastable phase. The anode active material in the present disclosure has excellent capacity properties by maintaining the BCC structure as the metastable phase, even when the proportion of high-priced V is low, or when high-priced V is not included.

The base material is usually a hydrogen storing alloy containing Ti and Cr. The base material preferably contains Ti and Cr as main components. "Ti and Cr as main components" means that the total proportion of Ti and Cr is the most with respect to all the metals configuring the base material. The total proportion of Ti and Cr with respect to all the metals configuring the base material is, for example, 50 at % or more, may be 70 at % or more, may be 90 at % or more, and may be 95 at % or more. The composition of the base material is determined by, for example, dissolving the base material in acid and measuring it by an ICP optical-emission spectroscopy analysis (ICP-OES).

The proportion of Ti and Cr in the base material is not particularly limited if the proportion allows the BCC structure to be maintained as the metastable phase. The proportion of Ti with respect to the total of Ti and Cr (Ti/(Ti+Cr)) is, for example, 30 at % or more, and may be 40 at % or more. Meanwhile, the proportion of Ti with respect to the total of Ti and Cr (Ti/(Ti+Cr)) is, for example, 70 at % or less, and may be 60 at % or less.

The base material may contain just Ti and Cr as the metal, and may further contain additional metal (other than Ti and Cr). Examples of the additional metal may include V (vanadium). The base material may or may not contain V. In the former case, the proportion of V in the base material is preferably the proportion capable of maintaining the BCC structure as the metastable phase, but not the stable phase. The reason therefor is to obtain an anode active material with excellent capacity properties by maintaining the BCC structure even when the proportion of high-priced V is low. The proportion of V in the base material is, for example, 25 at % or less, may be 15 at % or less, and may be less than 10 at %. Also, the base material may contain Mo (molybdenum) as the additional metal. The proportion of Mo in the base material is, for example 20 at % or less, and may be 15 at % or less.

The base material includes a BCC structure as a metastable phase. The definition of the metastable phase is as described above. The BCC structure refers to a Body-Centered Cubic structure. Also, a crystal phase including the BCC structure is referred to as a BCC phase. The base material preferably includes the BCC phase as a main phase. "The BCC phase as a main phase" means that the proportion of the BCC phase in the base material is the most with respect to all the crystal phases configuring the base material. The proportion of the BCC phase with respect to all the crystal phases configuring the base material is, for example, 50 weight % or more, may be 70 weight % or more, and may be 90 weight % or more. The proportion of the BCC phase in the base material can be determined by, for example, a quantitative analysis by an X-ray diffraction (such as a quantitative method with R value and a Liebert method). The base material may include just the BCC phase as the crystal phase, and may include an additional crystal phase to the BCC phase.

Examples of the shape of the base material may include a granular shape. The average particle size $(D_{50})$ of the base material is, for example, 1 μm or more and 500 μm or less.

2. Coating Layer

The coating layer in the present disclosure coats the base material, and contains a catalyst metal and a metal with oxygen affinity that is more than oxygen affinity of Ti.

The catalyst metal is a metal configuring the catalyst that promotes at least one of storing reaction and releasing reaction of hydrogen. Examples of the catalyst metal may include a group 10 element such as Ni, Pd and Pt. The coating layer may contain one kind of the catalyst metal, and may contain two kinds or more of the catalyst metal. The coating layer may, as the catalyst metal, contain Ni as a main component. The proportion of Ni with respect to all the catalyst metals included in the coating layer is, for example, 50 at % or more, may be 70 at % or more, and may be 90 at % or more. Also, the coating layer may, as the catalyst metal, contain Pd as a main component. The proportion of Pd with respect to all the catalyst metals included in the coating layer is, for example, 50 at % or more, may be 70 at % or more, and may be 90 at % or more.

The metal with oxygen affinity in the present disclosure is Ti or a metal with oxygen affinity that is more than oxygen affinity of Ti. When Me designates the metal with oxygen affinity more than that of Ti, Me is usually a metal positioned lower than Ti in Ellingham diagram when temperature is 298K. Examples of Me may include a rare earth element. The rare earth element refers to Sc, Y and 15 kinds of elements (La to Lu) belonging to lanthanoid. Also, examples of Me may include Mg, Al and Ca. The coating layer may contain one kind of the metal with oxygen affinity, and may contain two kinds or more of the metal with oxygen affinity.

There are no particular limitations on the proportions (at %) of the catalyst metal and the metal with oxygen affinity in the coating layer. The proportion (at %) of the catalyst metal may be smaller than, equal to or larger than the proportion (at %) of the metal with oxygen affinity. Examples of the composition of the coating layer may include $Ti_xNi$ (1≤x≤2) and $LaNi_5$. Also, the composition of the coating layer is preferably a composition with which hydrogen storing ability is exhibited. The reason therefor is to cause hydrogen dispersion smoothly. The hydrogen storing amount of the coating layer is, for example, 0.6 weight % or more and may be 1.0 weight % or more.

The coating layer coats the base material. The coverage of the coating layer with respect to the base material is, for example, 50' or more, may be 70% or more, and may be 100'. The average thickness of the coating layer is not particularly limited, but for example, it is 100 nm or more, may be 300 nm or more, and may be 500 nm or more. Meanwhile, the average thickness of the coating layer is, for example, 3000 nm or less, may be 2000 nm or less, and may be 1500 nm or less.

3. Anode Active Material

The anode active material in the present disclosure includes the above described base material and coating layer. Examples of the shape of the anode active material may include a granular shape. The average particle size ($D_{50}$) of the anode active material is, for example, 1 μm or more and 500 μm or less. The anode active material in the present disclosure is used in an alkaline storage battery.

B. Alkaline Storage Battery

Figure 3:
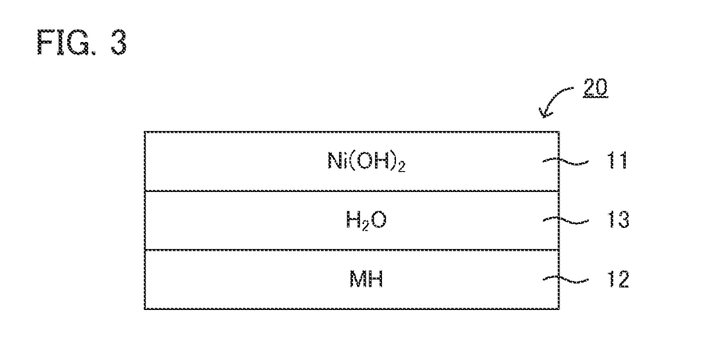
FIG. 3 is a schematic cross-sectional view exemplifying the alkaline storage battery in the present disclosure.

FIG. 3 is a schematic cross-sectional view exemplifying the alkaline storage battery in the present disclosure. Alkaline storage battery 20 shown in FIG. 3 includes cathode active material layer 11 containing $Ni(OH)_2$ as a cathode active material, anode active material layer 12 containing the above described anode active material (MH), and electrolyte layer 13 containing an alkaline solution, formed between the cathode active material layer 11 and the anode active material layer 12. The alkaline storage battery 20 shown in FIG. 3 corresponds to a so-called nickel-metal hydride battery (Ni-MH battery), in which following reactions occur:

Cathode:$NiOOH+H_2O+e^- \leftrightarrow Ni(OH)_2+OH^-$; and

Anode:$MH+OH^- \leftrightarrow M+H_2O+e^-$.

Figure 4:
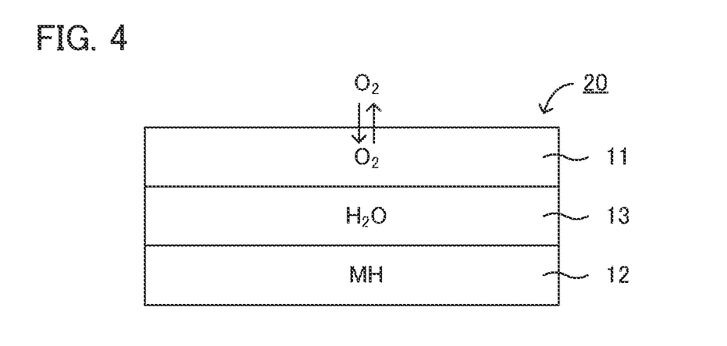
FIG. 4 is a schematic cross-sectional view exemplifying the alkaline storage battery in the present disclosure.

FIG. 4 is a schematic cross-sectional view exemplifying the alkaline storage battery in the present disclosure. In alkaline storage battery 20 shown in FIG. 4, cathode active material layer 11 is a layer utilizing oxygen ($O_2$) as the cathode active material. Oxygen is, for example, supplied from the atmospheric air during discharge and released to the atmospheric air during charge. The alkaline storage battery 20 shown in FIG. 4 corresponds to a so-called air-metal hydride battery (Air-MH battery), in which following reactions occur:

Cathode:$O_2+2H_2O+4e^- \leftrightarrow 4OH^-$; and

Anode:$MH+OH^- \leftrightarrow M+H_2O+e^-$.

According to the present disclosure, since the anode active material layer contains the above described anode active material, the alkaline storage battery may have excellent capacity properties.

1. Anode Active Material Layer

The anode active material layer contains at least the anode active material described in "A. Anode active material" above. The anode active material layer may further contain at least one of a conductive material and a binder. Addition of the conductive material improves the electron conductivity of the anode active material layer. Examples of the conductive material may include a metal powder such as Ni powder, an oxide such as cobalt oxide, graphite, and a carbon material such as carbon nanotube. Further, examples of the binder may include a cellulose such as carboxymethylcellulose (CMC), polyol such as polyvinyl alcohol (PVA) and a fluorine resin such as polyvinylidene fluoride (PVDF).

2. Cathode Active Material Layer

The cathode active material layer contains at least a cathode active material. The cathode active material layer may further contain at least one of a conductive material and a binder. Examples of the cathode active material may include a simple substance of metal, an alloy and a hydroxide. In specific, the cathode active material preferably contains a Ni element, more preferably a nickel hydroxide. The conductive material and the binder are in the same contents as those described for the anode above. Also, when the cathode active material of the cathode active material layer is air, a catalyst that promotes electrode reaction is preferably included. Examples of the catalyst may include a noble metal such as Pt and a composite oxide such as a Perovskite type oxide.

3. Electrolyte Layer

The electrolyte layer is formed between the cathode and the anode, and contains an alkaline solution as a liquid electrolyte. Examples of the solute of the alkaline solution may include a metal hydroxide such as a potassium hydroxide (KOH) and a sodium hydroxide (NaOH). Examples of the solvent of the alkaline solution may include water. The proportion of water with respect to all the solvents of the liquid electrolyte is, for example, 50 mol % or more, may be 70 mol % or more, and may be 90 mol % or more. Also, the concentration of the solute in the alkaline solution is, for example, 3 mol/L or more and may be 5 mol/L or more. Also, a separator may be arranged between the cathode and the anode, and the separator may be impregnated with the alkaline solution.

4. Alkaline Storage Battery

The alkaline storage battery in the present disclosure includes at least the above described anode active material layer, cathode active material layer and electrolyte layer. The alkaline storage battery may include a cathode current collector for collecting electrons from the cathode active material layer. Examples of the material for the cathode current collector may include stainless steel, nickel, iron and titanium. Examples of the shape of the cathode current collector may include a foil shape, a mesh shape, and a porous shape. Also, the alkaline storage battery may include an anode current collector for collecting electrons from the anode active material layer. Examples of the material for the anode current collector may include copper, stainless steel, nickel, iron, titanium and carbon. Examples of the shape of the anode current collector may include a foil shape, a mesh shape, and a porous shape. As an outer package of the alkaline storage battery, conventionally known outer packages may be used. Applications of the alkaline storage battery are not particularly limited, and it may be used for arbitrary applications.

C. Method for Producing Anode Active Material

Figure 5:
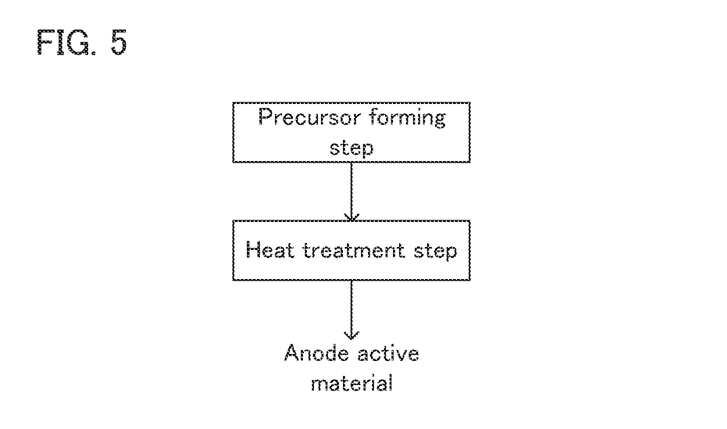
FIG. 5 is a flow chart exemplifying the method for producing the anode active material in the present disclosure.

FIG. 5 is a flow-chart exemplifying the method for producing the anode active material in the present disclosure. In the production method shown in FIG. 5, first, the specified base material is coated with the specified coating layer to form a precursor (precursor forming step). The base material in the precursor contains Ti and Cr, and includes a BCC structure as a metastable phase. Also, the coating layer in the precursor contains a catalyst metal and a metal with oxygen affinity that is more than oxygen affinity of Ti. Next, a heat treatment is performed to the precursor in the specified conditions (heat treatment step). In specific, the heat treatment is performed to the precursor to disperse oxygen included in an oxide film present in an interface between the coating layer and the base material, while maintaining the BCC structure in the base material.

According to the present disclosure, a heat treatment is performed to the precursor to disperse oxygen included in an oxide film present in an interface between the coating layer and the base material, while maintaining the BCC structure in the base material, and thus an anode active material with excellent capacity properties may be obtained.

1. Precursor Forming Step

The precursor forming step in the present disclosure is a step of forming a precursor by coating a base material containing Ti and Cr and including a BCC structure as a metastable phase, with a coating layer containing a catalyst metal and a metal with oxygen affinity that is more than oxygen affinity of Ti.

The details of the base material and the coating layer are in the same contents as those described in "A. Anode active material" above. Also, examples of the method for synthesizing the base material may include a method in which a molten metal containing the constituents of the base material is quenched. Examples of such a method may include a gas atomizing method and a roll quenching method. Also, examples of the method for coating the base material with the coating layer may include a PVD method such as a spattering method and a vacuum vapor deposition method; and a CVD method such as a thermal CVD method.

2. Heat Treatment Step

The heat treatment step in the present disclosure is a step of performing a heat treatment to the precursor to disperse oxygen included in an oxide film present in an interface between the coating layer and the base material, while maintaining the BCC structure in the base material. Since the coating layer contains the metal with oxygen affinity, by the heat treatment, oxygen included in the oxide film present in the surface of the base material is dispersed more to the coating layer side than to the base material side. Also, since the base material after the heat treatment maintains the BCC structure, excellent capacity properties can be obtained.

The heat treatment temperature is not particularly limited; for example, it is 300° C. or more, may be 400° C. or more, and may be 450° C. or more. When the heat treatment temperature is low, the dispersion of oxygen included in the oxide film may not be easily caused. Meanwhile, the heat treatment temperature is, for example, 600° C. or less. When the heat treatment temperature is high, the BCC structure in the base material may easily change its form to a Laves structure which is a stable phase.

There are no particular limitations on the heat treatment time; for example, it is 30 minutes or more, may be 1 hour or more, and may be 1.5 hours or more. Meanwhile, the heat treatment time is, for example, 10 hours or less. Also, the atmosphere during the heat treatment is not particularly limited, but a low oxygen atmosphere such as a vacuum and an inert gas atmosphere is preferable in order to avoid the oxidization. Also, in the present disclosure, the heat treatment conditions are preferably adjusted so as to obtain the anode active material described in "A. Anode active material" above.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Comparative Example 1

Powder of a base material (hydrogen storing alloy) having the composition of $Ti_{45}Cr_{45}Mo_{10}$(at %) was produced by a gas atomizing method. In specific, using a gas atomizing device, a high pressure Ar gas was sprayed to a molten alloy of TiCrMo to quench the molten alloy, and thereby a base material including a BCC structure as a metastable phase was obtained. The obtained powder of the base material was classified to the particle size of 38 μm or more and 100 μm or less, using a sieve of 38 μm and a sieve of 100 μm.

The surface of the obtained base material was coated with a catalyst (Ni) and a metal with oxygen affinity (Ti) to form a coating layer on the base material. In specific, the base material was entirely coated with the coating layer by barrel spattering so that the average thickness of the coating layer became 300 nm. Thereby, a precursor comprising: the base material including the BCC structure as a metastable phase; and the coating layer containing Ni and Ti, was obtained. Incidentally, the ratio (at %) of Ni and Ti in the coating layer was Ni:Ti=1:1.

Example 1

A precursor was obtained in the same manner as in Comparative Example 1. A heat treatment was performed to the obtained precursor in the conditions of: in a vacuum, at 500° C. and for 2 hours. Thereby, an anode active material comprising: the base material including the BCC structure as a metastable phase; and the coating layer containing Ni and Ti, was obtained.

Comparative Example 2

A base material classified was obtained in the same manner as in Comparative Example 1. The surface of the obtained base material was coated with a catalyst (Ni) to form a coating layer on the base material. In specific, the base material was entirely coated with the coating layer by barrel spattering so that the average thickness of the coating layer became 1000 nm. Thereby, a precursor comprising: the base material including the BCC structure as a metastable phase; and the coating layer containing Ni, was obtained.

Comparative Example 3

A precursor was obtained in the same manner as in Comparative Example 2. A heat treatment was performed to the obtained precursor in the conditions of: in a vacuum, at 500° C. and for 2 hours. Thereby, an anode active material comprising: the base material including the BCC structure as a metastable phase; and the coating layer containing Ni, was obtained.

[Evaluation]
<Auger Electron Spectroscopy>

An elemental analysis by Auger spectroscopy (AES) was conducted to the precursors obtained in Comparative Examples 1, 2, and the anode active materials obtained in Example 1 and Comparative Example 3. An Auger electron spectroscopy device (JAMP-9510F) from JEOL Ltd. Was used for the measurement. The conditions for Ar ion etching and analysis were as follows:

<Conditions for Ar Ion Etching>
  Acceleration voltage: 2 kV;
  Filament current: 20 mA; and
  Etching interval: 30 seconds;
<Conditions for Analysis>
  Acceleration voltage: 10 kV;
  Irradiation current: 10 nA;
  Beam diameter: 80 nm;
  Mode:high sensitivity mode (M5/MULTI mode); and
  Step interval: 1 eV.

Also, a sample was formed in advanced by layering $SiO_2$ with a thickness of 100 nm on a Si substrate, and an Ar ion etching was conducted to the sample to measure the time taken until the spectrum intensity of oxygen became the half. Thereby, an etching rate (the etched depth ($SiO_2$ conversion value) per operation of the Ar ion etching) was obtained.

Figure 6:
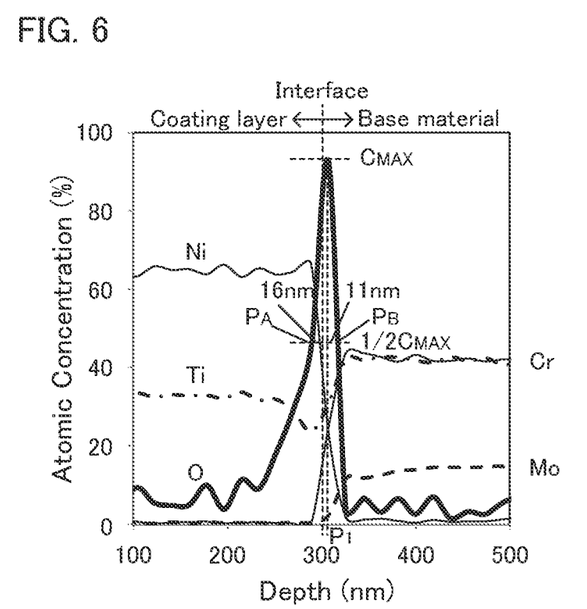
FIG. 6 is the result of an AES analysis to the precursor produced in Comparative Example 1.
Figure 7:
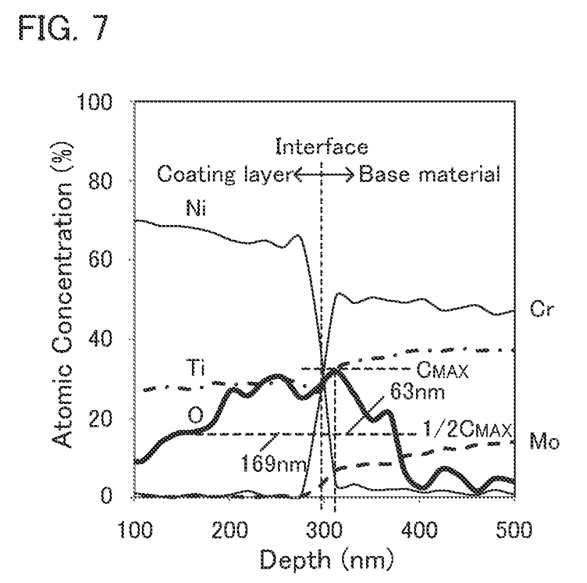
FIG. 7 is the result of an AES analysis to the precursor produced in Example 1.

As a representative example, the result of the precursor (before the heat treatment) obtained in Comparative Example 1 is shown in FIG. 6, and the result of the anode active material (after the heat treatment) obtained in Example 1 is shown in FIG. 7. Incidentally, in FIG. 6 and FIG. 7, the atomic concentration of oxygen (O) is shown as 5 times for convenience.

As shown in FIG. 6, the point at which Ni concentration in the coating layer (Ni concentration in a region of the coating layer not containing Cr in the base material) was ½, was determined as an interface. Next, the maximum oxygen concentration Cwm near the interface and the position $P_1$ thereof were specified. Incidentally, "near" signifies the region within 100 nm from the interface. Next, in the region closer to the coating layer side than $P_1$, the position $P_A$ of the oxygen concentration curve where ½$C_{MAX}$ was obtained, was determined. Next, in the region closer to the base material side than $P_1$, the position $P_B$ of the oxygen concentration curve where ½$C_{MAX}$ was obtained, was determined. Next, the distance from the $P_1$ to the $P_A$ was obtained as the first thickness $T_A$ of the oxide film. Similarly, the distance from the $P_1$ to the $P_B$ was obtained as the second thickness $T_B$ of the oxide film. Also, the distance from the $P_A$ to the $P_B$ was obtained as the thickness T of the oxide film. Incidentally, the T, the $T_A$ and the $T_B$ satisfy $T=T_A+T_B$. The results are shown in Table 1.

Also, in the depth analysis by AES, elemental concentration measurement in the outermost surface of the measurement target and surface etching by spattering were repeatedly conducted. For this reason, the data obtained from the depth analysis is not the continuous data, but is the discrete data measured per surface etching. The measurement intervals (nm) calculated from the spattering rates are shown in Table 1. Incidentally, the measurement interval was $SiO_2$ conversion value.

Also, as shown in FIG. 7, the thickness of the oxide film and the maximum oxygen concentration of Example 1 were obtained in the same manners as in FIG. 6. Also, although not particularly illustrated, the thickness of the oxide film and the maximum oxygen concentration of Comparative Examples 2 and 3 were respectively obtained. The results are shown in Table 1. Also, based on the values shown in Table 1, $T_A/T_B$, $T_A - T_B$, and $C_{MAX}/T$ were calculated. The results are shown in Table 2.

TABLE 1

| | Coating layer | Heat treatment Temperature (° C.) | Heat treatment Time (h) | Thickness of oxide film (nm) T | Thickness of oxide film (nm) TA | Thickness of oxide film (nm) TB | Maximum oxygen concentration CMAX (at %) | Measurement interval DI (nm) |
|---|---|---|---|---|---|---|---|---|
| Comparative Example 1 | TiNi | — | — | 27 | 16 | 11 | 5.1 | 19 |
| Example 1 | TiNi | 500 | 2 | 232 | 169 | 63 | 5.6 | 19 |
| Comparative Example 2 | Ni | — | — | 93 | 55 | 38 | 7.5 | 21 |
| Comparative Example 3 | Ni | 500 | 2 | 159 | 86 | 73 | 5.8 | 21 |

TABLE 2

| | $T_A/T_B$ | $T_A - T_B$ | $C_{MAX}/T$ |
|---|---|---|---|
| Comparative Example 1 | 1.45 | 5 | 0.189 |
| Example 1 | 2.68 | 106 | 0.024 |
| Comparative Example 2 | 1.45 | 17 | 0.081 |
| Comparative Example 3 | 1.18 | 13 | 0.036 |

As shown in Table 1 and Table 2, $T_A/T_B$ of Example 1 was larger compared to Comparative Examples 1 to 3. In other words, oxygen included in the oxide film present in the surface of the base material was dispersed more to the coating layer side than to the base material side. Also, in Comparative Examples 1 to 3, $T_A - T_B$ was smaller than the measurement interval $D_1$, and the oxygen distribution was approximately symmetry on the basis of the peak of the oxygen concentration. On the other hand, in Example 1, $T_A - T_B$ was larger than the measurement interval $D_1$, and the oxygen distribution was asymmetry on the basis of the peak of the oxygen concentration; oxygen was dispersed more to the coating layer side than to the base material side. Also, in Example 1, $C_{MAX}/T$ was smaller compared to Comparative Examples 1 to 3. It means that oxygen included in the oxide film present in the surface of the base material was dispersed a lot by the heat treatment.

<Charge and Discharge Test>

An evaluation cell was produced respectively using the precursors obtained in Comparative Examples 1, 2, and the anode active materials obtained in Example 1 and Comparative Example 3.

First, an anode was produced. The precursor or the anode active material, a conductive material Ni, and two kinds of binders (carboxymethylcellurose (CMC) and polyvinyl alcohol (PVA)) were added so that the weight ratio became (the precursor or the anode active material): the conductive material: CMC: PVA=49:49:1:1, and the mixture was kneaded to produce a composition in paste form. This composition in paste form was pasted on a porous nickel, then dried at 80° C., and after that, pressurized at 490 MPa by roll-pressing to obtain an anode.

Next, a cathode was produced. Nickel hydroxide (Ni(OH)$_2$), cobalt oxide (CoO) as a conductive material, and two kinds of binders (carboxymethylcellurose (CMC) and polyvinyl alcohol (PVA)) were added so that the weight ratio became Ni(OH)$_2$: CoO: CMC: PVA=88:10:1:1, and the mixture was kneaded to produce a composition in paste form. This composition in paste form was pasted on a porous nickel, then dried at 80° C., and after that, pressurized at 490 MPa by roll-pressing to obtain a cathode. Incidentally, the capacity ratio of the anode and the cathode was adjusted to the anode: the cathode=1:3.

Next, a liquid electrolyte was produced. Pure water was added to KOH, and the concentration of KOH was adjusted to 6 mol/L, and thereby a liquid electrolyte was obtained. After that, the liquid electrolyte and a separator (PE/PP non-woven fabric) were arranged in a container, and further, the anode (working electrode), the cathode (counter electrode) and Hg/HgO electrode (reference electrode) were arranged to obtain an evaluation cell.

Charge and discharge test was conducted to the obtained evaluation cell. The charge and discharge test was conducted under an environment of temperature at 25° C. with constant current charge and discharge. Charge was conducted at the rate of C/5 for 10 hours, and discharge was conducted at the rate of C/10, until the potential of the working electrode became −0.5 V. The results are shown in Table 3.

TABLE 3

| | Composition of base material (at %) | Particle size (μm) | Coating layer Composition | Coating layer Thickness (nm) | Heat treatment Temperature (° C.) | Heat treatment Time (h) | Discharge capacity (mAh/g) |
|---|---|---|---|---|---|---|---|
| Comp. Ex. 1 | Ti45Cr45Mo10 | 38-100 | TiNi | 300 | — | — | 4 |
| Example 1 | Ti45Cr45Mo10 | 38-100 | TiNi | 300 | 500 | 2 | 330 |
| Comp. Ex. 2 | Ti45Cr45Mo10 | 38-100 | Ni | 1000 | — | — | 0 |
| Comp. Ex. 3 | Ti45Cr45Mo10 | 38-100 | Ni | 1000 | 500 | 2 | 3 |

As shown in Table 3, discharge capacity was scarcely obtained in Comparative Example 1, but discharge capacity of 330 mAh/g was obtained in Example 1. This was presumably because, on the occasion of the heat treatment, the BCC structure in the base material was maintained as well as oxygen included in the oxide film present in the surface of the base material was dispersed more to the coating layer side than to the base material side. On the other hand, discharge capacity was not obtained in Comparative Example 2, and discharge capacity was scarcely obtained in Comparative Example 3. This was presumably because, on the occasion of the heat treatment, although the BCC structure in the base material was maintained, oxygen included in the oxide film present in the surface of the base material was not dispersed more to the coating layer side than to the base material side.

Examples 2 to 20

An evaluation cells were respectively obtained in the same manner as in Example 1, except that the composition of the base material, the particle size of the base material, the composition of the coating layer, the thickness of the coating layer and the heat treatment conditions were changed as shown in Table 4. Charge and discharge tests were respectively conducted to the obtained evaluation cells. The results are shown in Table 4.

TABLE 4

| | Composition of base material (at %) | Particle size (μm) | Coating layer | | Heat treatment | | Discharge capacity (mAh/g) |
|---|---|---|---|---|---|---|---|
| | | | Composition | Thickness (nm) | Temperature (° C.) | Time (h) | |
| Example 2 | Ti45Cr45Mo10 | 38-100 | TiNi | 300 | 400 | 2 | 341 |
| Example 3 | Ti45Cr45Mo10 | 38-100 | TiNi | 1000 | 400 | 2 | 407 |
| Example 4 | Ti45Cr45Mo10 | 38-100 | TiNi | 1000 | 500 | 2 | 385 |
| Example 5 | Ti45Cr45Mo10 | 38-100 | TiNi | 1000 | 600 | 2 | 320 |
| Example 6 | Ti45Cr45Mo10 | <38 | TiNi | 1000 | 500 | 2 | 349 |
| Example 7 | Ti47.5Cr47.5Mo5 | 38-100 | TiNi | 100 | 500 | 2 | 411 |
| Example 8 | Ti47.5Cr47.5Mo5 | 38-100 | TiNi | 300 | 500 | 2 | 491 |
| Example 9 | Ti47.5Cr47.5Mo5 | 38-100 | TiNi | 1000 | 500 | 2 | 435 |
| Example 10 | Ti50Cr50 | 38-100 | TiNi | 100 | 500 | 2 | 347 |
| Example 11 | Ti50Cr50 | 38-100 | TiNi | 200 | 500 | 2 | 375 |
| Example 12 | Ti50Cr50 | 38-100 | TiNi | 300 | 500 | 2 | 434 |
| Example 13 | Ti50Cr50 | <38 | TiNi | 300 | 500 | 2 | 371 |
| Example 14 | Ti50Cr50 | 38-100 | TiNi | 500 | 500 | 2 | 494 |
| Example 15 | Ti50Cr50 | 38-100 | TiNi | 1000 | 500 | 2 | 471 |
| Example 16 | Ti50Cr50 | 38-100 | TiNi | 2000 | 500 | 2 | 374 |
| Example 17 | Ti45Cr45Mo10 | 38-100 | Ti2Ni | 1000 | 300 | 2 | 349 |
| Example 18 | Ti45Cr45Mo10 | 38-100 | Ti2Ni | 1000 | 400 | 2 | 366 |
| Example 19 | Ti45Cr45Mo10 | 38-100 | Ti2Ni | 1000 | 500 | 2 | 361 |
| Example 20 | Ti45Cr45Mo10 | 38-100 | LaNi5 | 1000 | 500 | 2 | 289 |

As shown in Table 4, excellent capacity properties were obtained in Examples 2 to 20.

Comparative Examples 4 and 5

Evaluation cells were respectively obtained in the same manner as in Comparative Example 3, except that the composition of the base material and the composition of the coating layer were changed as shown in Table 5. Charge and discharge tests were respectively conducted to the obtained evaluation cells in the same manner as above. The results are shown in Table 5.

TABLE 5

| | Composition of base material (at %) | Particle size (µm) | Coating layer Composition | Coating layer Thickness (nm) | Heat treatment Temperature (° C.) | Heat treatment Time (h) | Discharge capacity (mAh/g) |
|---|---|---|---|---|---|---|---|
| Comp. Ex. 4 | Ti50Cr50 | 38-100 | Ni | 1000 | 500 | 2 | 3 |
| Comp. Ex. 5 | Ti50Cr50 | 38-100 | Pd | 1000 | 500 | 2 | 107 |

As shown in Table 5, discharge capacity was scarcely obtained in Comparative Example 4. Also, in Comparative Example 5, discharge capacity was obtained to some extent by using Pd as a catalyst, but it was lower than the discharge capacities of the above described Examples 1 to 20. In this manner, it was confirmed that the anode active material in the present disclosure had excellent capacity properties.

REFERENCE SINGS LIST 1 base material
2 coating layer
3 oxide film
10 anode active material
11 cathode active material layer
12 anode active material layer
13 electrolyte layer
20 alkaline storage batter

What is claimed is:

1. An anode active material to be used in an alkaline storage battery,
the anode active material comprising:
a base material containing Ti and Cr, and including a BCC structure as a metastable phase; and
a coating layer that coats the base material, and has a composition of TixNi (1≤x≤2); wherein
the total proportion of Ti and Cr with respect to all metals configuring the base material is 90 at % or more,
and a proportion of V in the base material is less than 10 at %,
an oxide film is present in an interface between the coating layer and the base material; and
when a maximum oxygen concentration $C_{MAX}$ (at %) of the oxide film near the interface, and a position $P_1$ where the $C_{MAX}$ is obtained, are determined by Auger electron spectroscopy, and when $1/2C_{MAX}$ designates a half value of the $C_{MAX}$, $P_A$ designates a position where the $1/2C_{MAX}$ is obtained in a region closer to the coating layer side than the $P_1$, PB designates a position where the $1/2C_{MAX}$ is obtained in a region closer to the base material side than the position $P_1$, and when a distance from the $P_1$ to the $P_A$ is regarded as a first thickness $T_A$ (nm) of the oxide film, a distance from the $P_1$ to the PB is regarded as a second thickness $T_B$ (nm) of the oxide film, a distance from the $P_A$ to the PB is regarded as a thickness T (nm) of the oxide film, and a measurement interval in a depth direction is regarded as $D_I$ (nm),
the anode active material satisfies at least one of:
(i) a rate of the $T_A$ with respect to the $T_B$, which is $T_A/T_B$ is 1.50 or more;
(ii) a difference between the $T_A$ and the $T_B$, which is $T_A-T_B$ is larger than the Dr; and
(iii) a rate of the $C_{MAX}$ with respect to the T, which is $C_{MAX}/T$ is 0.035 or less;
the thickness T of the oxide film is 200 nm or more; and
the thickness of the coating layer is 100 nm or more and 2000 nm or less.

2. The anode active material according to claim 1, wherein the anode active material satisfies the (i).

3. The anode active material according to claim 1, wherein the anode active material satisfies the (ii).

4. The anode active material according to claim 1, wherein the anode active material satisfies the (iii).

5. The anode active material according to claim 1, wherein the base material contains V, and a proportion of the V in the base material is less than 10 at %.

6. The anode active material according to claim 1, wherein the base material does not contain V.

7. An alkaline storage battery including a cathode active material layer, an anode active material layer, and an electrolyte layer arranged between the cathode active material layer and the anode active material layer; wherein
the anode active material layer contains the anode active material according to claim 1.

8. The anode active material according to claim 1, wherein the base material includes a granular shape and the average particle size ($D_{50}$) of the base material is 1 µm or more and 100 µm or less.

9. The anode active material according to claim 1, wherein the anode active material satisfies all of (i), (ii) and (iii).

10. The anode active material according to claim 1, wherein the base material contains Mo.

11. A method for producing the anode active material to be used in an alkaline storage battery according to claim 1, the method comprising:
a precursor forming step of forming a precursor by coating a base material containing Ti and Cr and including a BCC structure as a metastable phase, with a coating layer having a composition of Ti$_x$Ni (1≤x≤2) and
a heat treatment step of performing a heat treatment to the precursor to disperse oxygen included in an oxide film present in an interface between the coating layer and the base material, while maintaining the BCC structure in the base material.

12. The method for producing the anode active material according to claim 11, wherein a heat treatment temperature in the heat treatment step is 300° C. or more and 600° C. or less.

13. The method for producing the anode active material according to claim 11, wherein a heat treatment time in the heat treatment step is 30 minutes or more and 10 hours or less.

* * * * *